United States Patent [19]
Carruthers

[11] 3,778,832
[45] Dec. 11, 1973

[54] POSITION PLOTTING APPARATUS

[76] Inventor: Eben H. Carruthers, 40 Warren, Warrenton, Oreg. 97146

[22] Filed: June 22, 1972

[21] Appl. No.: 265,191

[52] U.S. Cl............... 343/112 PT, 340/24, 343/115
[51] Int. Cl............................................... G01s 5/08
[58] Field of Search...................... 343/112 PT, 115; 340/24

[56] References Cited
UNITED STATES PATENTS

| | | | |
|---|---|---|---|
| 3,119,108 | 1/1964 | Schneiderman............... | 343/112 PT |
| 2,364,731 | 12/1944 | Luck............................. | 343/112 PT |
| 3,151,310 | 9/1964 | Shepherd et al............. | 343/112 PT |

*Primary Examiner*—Benjamin A. Borchelt
*Assistant Examiner*—Denis H. McCabe
*Attorney*—John W. Stuart

[57] ABSTRACT

Position-plotting apparatus which may be mounted on and is rotatable with the directional antenna of a radio direction finder. The apparatus includes a mounting bracket which may be secured to the antenna, a chart platform mounted on the bracket for rotation independent of the antenna about an axis coinciding with the rotational axis of the antenna for supporting a chart of a given region, locking shoes for releasably locking the chart platform in a selected position relative to the antenna, and a parallel line overlay overlying the chart platform. The overlay has elongated, parallel straight edges, and is mounted for movement over the chart platform with the straight edges of the overlay being maintained parallel to the directional axis of the antenna, permitting lines paralleling the directional axis of the antenna to be drawn on any part of the chart.

9 Claims, 4 Drawing Figures

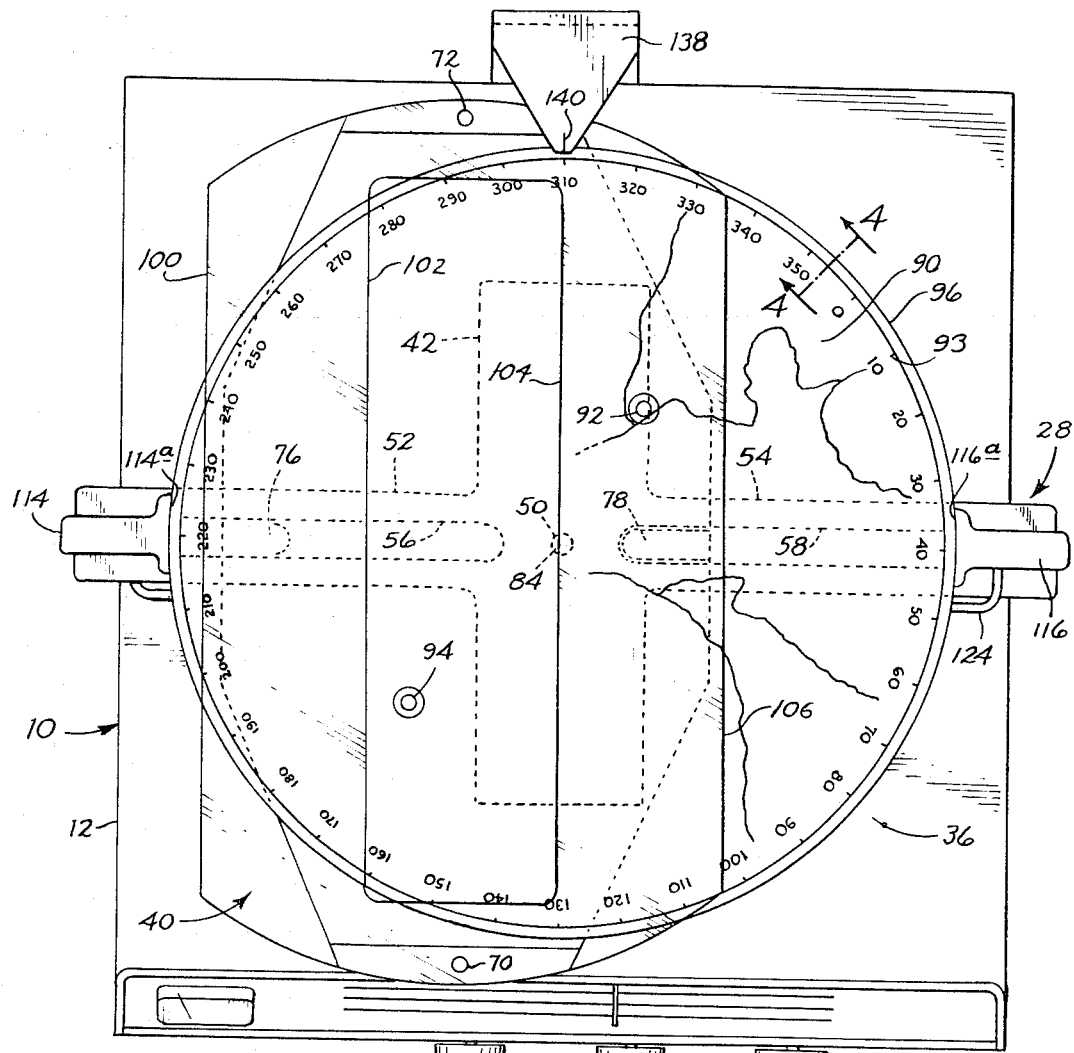
Fig. 2.
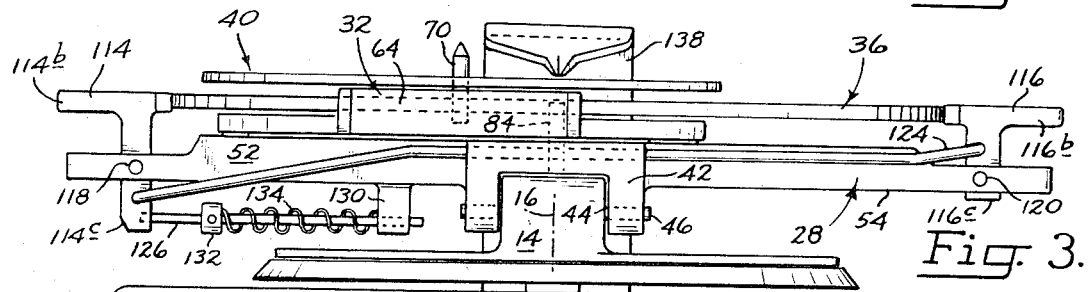
Fig. 3.
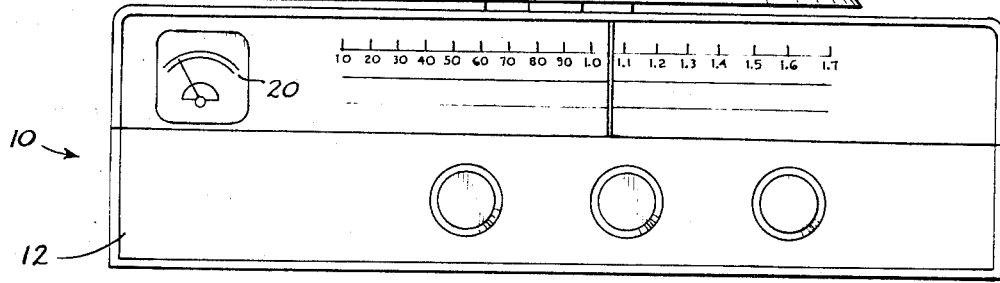

POSITION PLOTTING APPARATUS

SUMMARY AND BACKGROUND OF THE INVENTION

This invention relates to position-plotting apparatus for use with radio direction finders having rotatable antennas.

A radio direction finder (RDF) is commonly used in navigation to determine a craft's position. The RDF is used to determine the direction, or bearing, from which a radio signal from a known source is received at the craft. Knowing the heading of the craft and the direction to the source of the signal relative to the craft's heading, the bearing to the signal source can be determined. By drawing a straight line on an applicable chart from the signal source at the bearing determined establishes that the craft is at some point along the line. This procedure then is repeated, determining the bearing to another radio signal source coming from a different direction. The point at which the two lines thus plotted on the chart intersect indicates the position of the craft at that time.

Such plotting in the past generally has required that bearing readings from the RDF be transferred by protractors and other drafting instruments to a chart separated from the RDF. This is slow and sometimes errors are committed in the transfer of information.

The importance of quickly knowing the precise location of a craft is often critical in the case of a boat approaching the entrance of a harbor in fog or at night. The utility of the invention is particularly appreciated by the pilot of a boat at such times.

Various position-plotting devices coupled to radio direction finders in different manners have been proposed in the past. For the most part, however, these have been cumbersome, complex, expensive and not readily adaptable to existing RDF equipment.

A general object of the invention is to provide novel position-plotting apparatus for use with a radio direction finder having a rotatable antenna, which apparatus is inexpensively constructed, and is simple, rapid, and efficient in operation.

Another object is to provide novel position-plotting apparatus which eliminates the need to transfer bearing readings from an RDF to charts separated from the RDF. By eliminating such transfer steps, the chances for error are markedly reduced.

More specifically, the apparatus includes a mounting bracket which may be secured to the rotatable antenna of an RDF for rotation therewith, a chart platform mounted horizontally on the bracket and rotatable independent of the antenna about an axis coinciding with the rotational axis of the antenna, releasable locking means for securing the chart platform in a selected position relative to the antenna, and a parallel line overlay overlying the chart platform mounted for movement thereover with a straight edge on the overlay maintained parallel to the directional axis of the antenna. In operation, the directional axis of the antenna is directed in a known manner toward a radio signal source, the locking means is released and the chart platform is rotated whereby a chart mounted threreon is properly aligned with the area in which the craft is traveling, and then the chart platform once again is locked in place. The overlay is shifted laterally over the chart until its straight edge intersects the position of the selected radio signal source on the chart, and a line paralleling the directional axis of the antenna is drawn through the position of the signal source on the chart. A second signal source then is selected and a similar procedure is followed. The intersection of the two lines on the chart is the present position of the craft.

DRAWINGS

These and other objects and advantages will become more fully apparent when the following description is read in conjunction with the drawings, wherein:

FIG. 2 is a top plan view of the apparatus mounted on the radio direction finder;

FIG. 3 is a front elevation view of the apparatus and radio direction finder illustrated in FIG. 2; and FIG. 4 is a cross-sectional view of an edge of a chart platform in the apparatus, taken generally along the line 4—4 in FIG. 2.

DETAILED DESCRIPTION OF THE INVENTION

Figure 1:
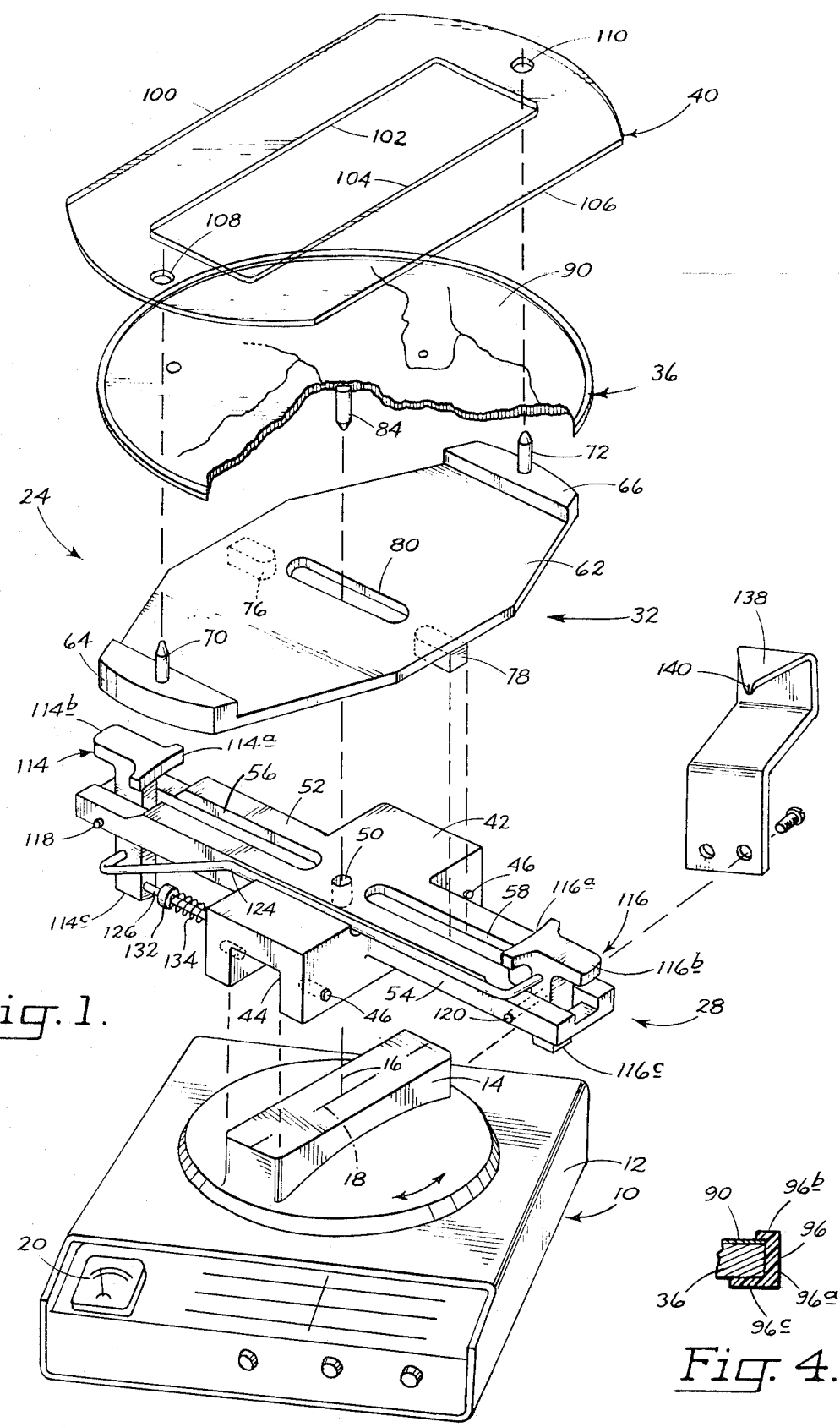
FIG. 1 is an exploded perspective view of apparatus according to the invention and a radio direction finder on which the same may be mounted.

Referring first specifically to FIG. 1, at 10 is indicated generally a conventional battery-powered radio direction finder (RDF) having a base 12 and a directional antenna 14 mounted on the base for rotation relative thereto about a vertical axis indicated generally at 16. When the RDF is properly tuned to a radio station, or source, from which radio signals emanate, the signals received by the RDF will be weakest when the directional axis of the antenna, indicated generally by dashed line 18, is pointing directly toward the station. This is referred to as the "null" position. This may be determined either by an audible signal produced by the RDF or by the reading on a signal level indicator indicated generally at 20.

Apparatus according to the invention is indicated generally at 24. The apparatus includes the following major component parts as illustrated in the exploded perspective view of FIG. 1; a mounting frame 28, a slide mount, or guide member, 32, a chart mounting platform 36, and a parallel line overlay 40.

Describing mounting frame 28 in detail, it includes a central, elongated mounting bracket portion 42 having an inverted U-shaped cross section. It defines an elongated channel 44 along its underside for receiving antenna 14. The mounting frame may be secured to the antenna by the tightening of set screws 46 extending into channel 44 and against the sides of the antenna. With the mounting frame secured in proper position on the antenna, a vertical bore 50 therein coincides with rotational axis 16 of the antenna.

The mounting frame also includes a pair of elongated track portions 52, 54 which extend outwardly in opposite directions from bracket portion 42, normal to channel 44. Track portions 52, 54 have elongated, axially aligned guide slots 56, 58, respectively, extending therealong. With the mounting frame properly mounted on the antenna track portions 52, 54 and their associated guide slots extend radially outwardly in opposite directions from bore 50 and antenna axis 16 and are at right angles to the directional axis of antenna 14 and channel 44.

Guide member 32 includes an elongated, substantially planar central portion 62 and a pair of support portions 64, 66 projecting upwardly from opposite ends of the central portion. A pair of aligning pins 70, 72 are secured to and project upwardly from support portions 64, 66, respectively.

A pair of guide blocks 76, 78 are secured to and project downwardly from the underside of central portion 62. Blocks 76, 78 each have such width that they may be snugly, yet slidably, received in guide slots 56, 58, respectively. Guide blocks 76, 78 are so positioned on the guide member that a straight line extending between their respective centers is substantially normal to a straight line extending between aligning pins 70, 72. With blocks 76, 78 received in guide slots 56, 58, the guide member is mounted for movement in a direction extending normal to the longitudinal axis of channel 44, and thus normal to the directional axis of the antenna, with a line extending between aligning pins 70, 72 being maintained substantially parallel to the directional axis of the antenna throughout such movement.

An elongated slot 80 aligned with blocks 76, 78 extends across the center of the guide member to provide an opening to bore 50 with the guide member in any of its adjusted positions relative to the mounting frame.

Chart platform 36 is disk-shaped and has a planar upper surface. A pin 84 is secured to and projects downwardly from the center of the platform. Pin 84 is received in bore 50 in the mounting frame, thus mounting the platform for rotation relative to the mounting frame and antenna about an axis coinciding with the rotational axis for the antenna. With the apparatus assembled, pin 84 extends through slot 80 in member 32.

A circular chart 90, of the geographic region in which the craft is traveling at the time, has a diameter substantially equal to the diameter of chart platform 36, and is mounted on the platform. Such a chart should have the positions of at least two known radio signal sources noted thereon, such as are indicated generally at 92, 94. Printed as a part of the chart is the equivalent of a compass rose which is projected as an azimuth scale at the periphery of the chart, and is indicated generally at 93. The scale is so aligned on the chart that the zero on the scale indicates north. The scale can be shown either in true or magnetic compass directions as desired. However, since the chart will be used primarily with magnetic compasses, as will be explained later, the scale generally would show magnetic directions.

The chart is fastened to the chart platform by a flexible annular clamping ring 96 extending about the periphery of the platform. As is best illustrated in FIG. 4, ring 96 includes a web portion 96a which has a diameter substantially equal to the outer diameter of the chart platform, and a pair of vertically spaced flanges 96b, 96c secured to and projecting radially inwardly from web 96a. Flanges 96b, 96c are spaced apart a distance equal to, or slightly less, than the combined thickness of platform 36 and chart 90 so that they may be clamped over the top edge of the chart and the underside of the platform as illustrated in FIG. 4 to hold the chart on the platform. Since the clamping ring is flexible, upper flange 96b may be deformed upwardly to permit a chart either to be removed therefrom or inserted thereunder. With such a clamping ring, it is an easy matter to change charts on the mounting platform to correspond to the geographical region in which a craft is traveling.

Overlay 40, as illustrated, is a substantially rigid, transparent plastic sheet which has a plurality of elongated, parallel straight edges, indicated generally at 100, 102, 104, 106. The overlay also has a pair of holes 108, 110 adjacent its opposite ends which are disposed along a line extending parallel to the straight edges of the overlay. Holes 108, 110 are adapted to receive aligning pins 70, 72, respectively. With the apparatus assembled, overlay 40 rests on support portions 64, 66 of the guide member 32 with aligning pins 70, 72 snugly received in holes 108, 110 to maintain alignment of the overlay relative to the guide member. The overlay thus is mounted for movement over the chart platform in a direction normal to the directional axis of the antenna, with the parallel straight edges of the overlay maintained substantially parallel to the directional axis of the antenna. The multiple parallel straight edges provided reduce the distance which the overlay must be moved to align one of the edges with a desired point on the chart.

A pair of locking members, or shoes, 114, 116 are pivotally mounted on the opposite extremities of track portions 52, 54, respectively, by pins 118, 120. The locking members have inwardly facing, frictional bearing portions 114a, 116a, gripping portions 114b, 116b adjacent their outer edges, and depending portions 114c, 116c. Pins 118, 120 extend through depending portions 114c, 116c, respectively, to mount the locking members, whereby their bearing portions may be shifted into and out of engagement with diametrically opposed peripheral portions of the chart platform.

An elongated rigid rod 124 is pivotally connected adjacent one of its ends to locking member 114 in a region below pin 118 and adjacent its other end to locking member 116 in a region above pin 120. Rod 124 thus operatively interconnects the locking members in such a manner that depressing the gripping portion of one of the locking members to swing that locking member outwardly and away from the chart platform results in concurrent outward swinging of the other locking member, and, conversely, swinging of a locking member toward the chart platform results in concurrent swinging of the other locking member toward the platform.

Referring specifically to FIG. 3, an elongated, rigid rod 126 is pivotally connected at one of its ends to portion 114c of locking member 114 and at its other end extends slidably through a horizontal bore in a lug 130 secured to and depending from track portion 52. A collar 132 is secured, as by a set screw, on rod 126 intermediate its ends, and a compression spring 134 is interposed between lug 130 and collar 132. Spring 134 thus acts to bias locking members 114, 116 into frictional engagement with the periphery of the chart platform to lock it in a selected position relative to the mounting frame.

Also included in the apparatus is a reference member 138 which is attached, as by screws, to one side of base 12 of the RDF. The reference member has a reference mark 140 thereon which overlies the periphery of a chart on the platform. A line extending through the rotational axis for the antenna and reference mark 140 provides a lubber line for the device which may be positioned in the craft to parallel the lubber line on a compass which would be used in conjunction with the device. The lubber line generally is positioned to extend along a line paralleling the longitudinal center line of the craft with which it is used.

The apparatus thus described is operable simply and efficiently to obtain a plot of the position of the craft in which it is used. Initially, a chart of the region traveled is mounted on the chart platform and the RDF is mounted so that the lubber line extending through the rotational axis of the antenna and reference mark 140 parallels the lubber line on a compass which would be positioned in a convenient position near the RDF. The RDF is tuned to the frequency of a known radio signal source which is shown on the chart. The antenna is rotated until a minimum strength signal is obtained, indicating that the directional axis of the antenna is pointing directly at the signal source. The gripping portion of one of the locking members then is depressed to swing the locking shoes outwardly and away from the outer edge of the chart platform, thus releasing the platform. The chart platform is rotated independently of the antenna until the azimuth reading on the chart at reference mark 140 corresponds to the reading on the compass at that time, and the locking members are released to lock the platform in position. This positions the chart in true relation to the geographic area it represents. Overlay 40 then is shifted laterally until one of its parallel edges is aligned with the position of the known station on the chart to which the RDF is tuned. A straight line is drawn along the staight edge on the chart through the known station. A second radio station then is selected and the same procedure is followed to establish a second line on the chart. Where these two lines intersect indicates the position of the craft at that time.

With such apparatus, a plot of the position of a craft may be determined quickly and easily without the need for transferring bearing readings from the RDF to charts separated from the RDF. Further, the apparatus may be operated so quickly and easily that several transmitting stations can be checked in close order, and each one rechecked.

The apparatus also may be used to determine a compass course over any part of the chart. This is done by rotating the chart platform and adjusting overlay 40 until one of its straight edges extends along the desired course on the chart. The chart platform then is locked into position and the slide mount moved until one of its straight edges intersects the center point of the chart. The compass course then may be read directly from the azimuth scale where the straight edge which passes through the center of the chart intersects the scale.

While a preferred embodiment of the invention has been described herein, it should be apparent to those skilled in the art that variations and modifications may be made without departing from the spirit of the invention.

It is claimed and desired to secure by Letters Patent:

1. Position-plotting apparatus for use in combination with a radio direction finder having a directional antenna mounted for rotation about an upright axis permitting the directional axis of the antenna to be directed toward a radio signal source, the apparatus in operative condition comprising
    a mounting bracket
    means for securing said bracket to such antenna for rotation therewith,
    a chart platform having a generally planar upper surface,
    means mounting the chart platform on the mounting bracket for rotation independently of the bracket about an axis coinciding with the rotational axis for such antenna, with the upper surface of the platform in a substantially horizontal position,
    locking means for releasably locking said chart platform in a selected position relative to the mounting bracket whereby the platform is rotatable therewith,
    a parallel line overlay having at least one elongated straight edge overlying said chart platform, and
    means mounting said overlay on the mounting bracket with the straight edge of the overlay parallel to the directional axis of such antenna and for movement laterally of said chart platform and antenna in a direction normal to said straight edge with said straight edge maintained parallel to the directional axis of such antenna throughout movement.

2. The apparatus of claim 1, wherein said locking means comprises a pair of opposed locking shoes, means mounting said shoes on opposite sides of the chart platform for movement toward and away from the platform, and biasing means yieldably biasing said shoes into frictional contact therewith.

3. The apparatus of claim 2, which further comprises manually operable means for moving a shoe away from said platform and connecting means operatively interconnecting said shoes for producing movement of the other of said shoes away from the platform concurrently with movement of said first-mentioned shoe away from the platform.

4. The apparatus of claim 1, wherein said means mounting the overlay comprises an elongated track extending outwardly from the mounting bracket in a direction normal to the directional axis of the antenna, and a guide member mounting said overlay for movement along said track.

5. The apparatus of claim 4, wherein said chart platform is supported over said track and said guide member comprises support portions supporting the overlay above the chart platform.

6. The apparatus of claim 1, wherein said overlay has a width greater than half the width of the chart platform and includes other elongated straight edges disposed parallel to said one edge and spaced laterally therefrom across the width of said overlay.

7. The apparatus of claim 1, wherein the radio direction finder includes a base on which the antenna is mounted for rotation, and wherein said apparatus further comprises means for indicating the orientation of the chart platform relative to the base.

8. The apparatus of claim 1, wherein said chart platform is circular and is adapted to support on its upper surface a circular chart having substantially the same diameter as the platform, and which further comprises an annular clamp for holding such a chart on the platform, said clamp including an annular web portion having a diameter substantially equal to the diameter of the chart platform and upper and lower flanges projecting radially inwardly from the web, said flanges being spaced from each other a distance substantially equal to the combined thickness of the peripheral edges of the platform and a chart supported thereon, said upper flange being flexible upwardly from the chart platform to permit insertion of a chart thereunder.

9. Position-plotting apparatus for use in combination with a radio direction finder having a directional antenna mounted for rotation about an upright axis permitting the directional axis of the antenna to be directed toward a radio signal source, the apparatus in operative condition comprising a chart platform having a generally planar upper surface, means mounting the chart platform on the antenna for rotation independently of the antenna about an axis coinciding with the rotational axis of the antenna, locking means for releasably locking said chart platform in a selected position relative to the antenna, a parallel line overlay having at least one elongated straight edge, and means mounting said overlay on the antenna with the straight edge overlying the chart platform and extending parallel to the directional axis of the antenna, said mounting means mounting the overlay for movement laterally of the chart platform and antenna in a direction normal to the directional axis of the antenna with said straight edge maintained parallel to the directional axis of the antenna throughout movement.

* * * * *